No. 728,021.

Patented May 12, 1903.

UNITED STATES PATENT OFFICE.

ALBRECHT SCHMIDT, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION.

BLACK AZO DYE AND PROCESS OF MAKING SAME.

SPECIFICATION forming part of Letters Patent No. 728,021, dated May 12, 1903.

Application filed June 20, 1902. Serial No. 112,483. (Specimens.)

*To all whom it may concern:*

Be it known that I, ALBRECHT SCHMIDT, Ph. D., a citizen of the Empire of Germany, residing at Höchst-on-the-Main, Germany, have invented certain new and useful Improvements in the Manufacture of Azo Dyestuffs, of which the following is a specification.

I have found that monoazo dyestuffs easily obtained in the usual manner from 1:8:4-naphthylenediaminsulfonic acid may be transformed by the action of mineral acids into new azo dyestuffs, which apparently are derived from a 1:8-amidonaphtholsulfonic acid, whereas the monoazo dyestuffs from 1:8:4-naphthylenediaminsulfonic acid are very unstable, the dyestuff from picramic acid and 1:8:4-naphthylenediaminsulfonic acid, for instance, decomposing on the fiber on boiling, so that further dyeings in the same bath always appear yellow. The products obtained after treatment with mineral acids are quite stable, and therefore are themselves applicable as dyestuffs and are also capable of forming valuable disazo dyestuffs by combining with an amin, especially if the monoazo dyestuff employed as parent material was obtained by combining an amidosulfonic acid with 1:8:4-naphthylenediaminsulfonic acid. The transformation may be illustrated as follows:

Example I: 47.2 parts, by weight, of the azo dyestuff from naphthionic acid and 1:8:4-naphthylenediaminsulfonic acid, (obtained by combining one molecular proportion of diazotized naphthionic acid with one molecular proportion of 1:8:4-naphthylenediaminsulfonic acid in a solution acid with acetic acid or feebly alkaline with soda) are stirred with two thousand parts of water and two hundred and forty parts of hydrochloric acid for about eighteen hours while heating to about 90° centigrade, (oil-bath about 105° centigrade.) If boiled at an essentially higher temperature, dyestuffs of a less pure shade are obtained. The product is transformed into the sodium salt and is salted out. The dyestuff dyes wool violet.

Example II: In the same manner, for instance, the azo dyestuff from picramic acid and 1:8:4-naphthylenediaminsulfonic acid may be transformed by boiling, which takes somewhat longer, however, as the dyestuff is soluble with difficulty. It is therefore preferable to use a more concentrated acid—for instance, for 44.8 parts of the azo dyestuff about eight hundred parts of water and eight hundred parts of concentrated hydrochloric acid of 36° Baumé specific gravity. The transformation may also be effected with a more diluted solution. The dyestuff dyes wool black.

The following new azo dyestuffs may be mentioned without, however, limiting the invention to these examples. They are obtained by the action of dilute hydrochloric acid on the monoazo dyestuffs from 1:8:4-naphthylenediaminsulfonic acid and ortho-amidophenol-para-sulfonic acid ortho-amido-para-cresol-ortho-sulfonic acid

ortho-amido-ortho-nitrophenol-para-sulfonic acid para-nitro-ortho-amidophenol chloro-amidophenolsulfonic acid

chloroamidophenolsulfonic acid

Instead of hydrochloric acid other mineral acids may be used.

The following is a typical example of the manufacture of a disazo dyestuff from the products of transformation thus obtained.

Example III: 49.5 parts, by weight, of the transformation product obtained by boiling the monoazo dyestuff from naphthionic acid and 1:8:4-naphthylenediaminsulfonic acid are dissolved as sodium salt in about 2.5 liters of water. Into this solution, made acid to congo test paper with hydrochloric acid, is run a solution of para-nitrodiazobenzene obtained in the usual manner from 13.8 parts of para-nitranilin. After stirring for about twenty-four hours the solution is salted out with some common salt, separated by filtration, and the dyestuff is transformed in the usual manner into the sodium salt. The disazo dyestuff is soluble in water to a blue solution and dyes wool black. In a similar manner disazo dyestuffs may be obtained by combining anilin, para-toluidin, alpha-naphthylamin, beta-naphthylamin, &c., as also dyestuffs of sulfanilic acid corresponding with the dyestuffs of naphthionic acid.

Having now described my invention, what I claim is—

1. The herein-described process for the manufacture of monoazo dyestuffs by treating the monoazo dyestuffs of 1:8:4-naphthylenediaminsulfonic acid with mineral acids, substantially as set forth.

2. The herein-described process for the manufacture of disazo dyestuffs from the herein-described mineral acid transformation products of monoazo dyestuffs of 1:8:4-naphthylenediaminsulfonic acid obtained by combining an amidosulfonic acid with 1:8:4-naphthylenediaminsulfonic acid, which process consists in combining these transformation products with a diazotized amin, substantially as set forth.

3. As new products, the monoazo dyestuffs obtained by heating the monoazo dyestuffs of 1:8:4-naphthylenediaminsulfonic acid with mineral acids, being soluble in alkali, combining with diazo compounds of aromatic amins in an acid solution to black disazo dyestuffs and dyeing wool in an acid-bath.

4. As new products, the monoazo dyestuffs obtained by combining a diazotized amin in an acid solution with the monoazo dyestuffs obtained by heating the monoazo dyestuffs of 1:8:4-naphthylenediaminsulfonic acid with mineral acids, being soluble in alkali and dyeing wool black in an acid-bath.

In testimony that I claim the foregoing as my invention I have signed my name in presence of two subscribing witnesses.

ALBRECHT SCHMIDT.

Witnesses:
ALFRED BRISBOIS,
BERNHARD LEYDECKER.